United States Patent [19]
Zhao

[11] Patent Number: 5,558,066
[45] Date of Patent: Sep. 24, 1996

[54] FUEL SYSTEM VIBRATION DAMPER

[75] Inventor: Alan H. Zhao, Columbus, Ind.

[73] Assignee: Cummins Engine Company, Inc., Columbus, Ind.

[21] Appl. No.: 382,883

[22] Filed: Feb. 2, 1995

[51] Int. Cl.⁶ .................................................. F02M 37/04
[52] U.S. Cl. .................................................. 123/495; 74/574
[58] Field of Search ................................ 123/495, 509; 74/573 R, 573 F, 574

[56] References Cited

U.S. PATENT DOCUMENTS

| | | | |
|---|---|---|---|
| 3,473,409 | 10/1969 | Reisacher et al. | 74/574 |
| 4,362,139 | 12/1982 | Isobe et al. | 123/364 |
| 4,583,912 | 4/1986 | Ball et al. | 464/92 |
| 4,872,369 | 10/1989 | Critton et al. | 74/574 |
| 4,882,944 | 11/1989 | Vohl | 74/574 |
| 4,944,279 | 7/1990 | Woodard | 123/559.1 |
| 4,955,330 | 9/1990 | Fabi et al. | 74/574 |
| 4,976,246 | 12/1990 | Schierling et al. | 123/509 |
| 5,020,978 | 6/1991 | Nashif | 417/363 |
| 5,036,726 | 8/1991 | Wolf et al. | 74/574 |
| 5,046,471 | 9/1991 | Schmid | 123/509 |
| 5,058,453 | 10/1991 | Graham et al. | 74/574 |
| 5,127,585 | 7/1992 | Mesenich | 239/585.5 |
| 5,139,120 | 8/1992 | Gomi | 74/574 |
| 5,186,142 | 2/1993 | Laufer | 123/357 |
| 5,272,937 | 12/1993 | Brosowske et al. | 74/573 |
| 5,275,140 | 1/1994 | Knoedl et al. | 123/364 |
| 5,308,289 | 5/1994 | Funahashi | 74/574 |
| 5,413,535 | 5/1995 | Reik | 74/574 |

OTHER PUBLICATIONS

Wilson, Rob; "CAT Builds On Strong 3406 Foundation"; Nov. 1993; pp. 50–53; *Diesel Progress Engines & Drives*.

F. Pfeiffer and W. Prestl, "Hammering in Diesel–Engine Driveline Systems", *Nonlinear Dynamics*, 5: 477–492, 1994.

*Primary Examiner*—Thomas N. Moulis
*Attorney, Agent, or Firm*—Woodard, Emhardt, Naughton, Moriarty & McNett

[57] ABSTRACT

A fuel system vibration damper. A damper is affixed to the fuel system drive gear in order to counteract torsional vibration produced in the fuel system drive gear by the fuel system, such as a fuel injection system or a fuel pump. The damper additionally dampens the response of the entire fuel system drive train, thereby reducing engine noise due to gear rattle.

23 Claims, 6 Drawing Sheets

FUEL SYSTEM VIBRATION DAMPER

TECHNICAL FIELD OF INVENTION

The present invention relates generally to vibration dampers, and more particularly to fuel system vibration dampers.

BACKGROUND OF THE INVENTION

In diesel engines, very high injection pressures of up to 1,000 bar and above are aimed for in order to improve fuel preparation and to reduce the formation of pollutants. The demand for improved emissions and fuel economy is driving the industry toward higher injection pressures and shorter injection duration. In general, a steep injection curve at the beginning of injection is typical, and a sharply delimited end to injection is demanded.

Injection systems which are primarily mechanical in operation are generally used for such high-pressure injection. In this case, the fuel is compressed at the beginning of the injection process at a pumping element and the pumping energy is transmitted to the injection nozzle.

The fuel injection requirements of an engine are determined by the required engine performance parameters such as emissions, fuel economy, etc. Once the fuel injection requirements are determined, the load requirement of the mechanical system is determined. The mechanical system is then designed to fulfill such a load requirement. The fuel injection systems for modern diesel engines are required to produce very high injection pressures of up to a few thousand bar. The mechanical system is also required to produce a typically steep injection curve at the beginning of injection and a sharply delimited end to injection. These requirements lead to a mechanical system which produces highly transient, nearly impulse-like, short duration loads. A consequence of these loads is that the fuel injection drive shaft must sustain torque loads that are very cyclical, of very high magnitude, and which may reverse sign during the injection event. As the fuel injection requirements become more demanding, the injection drive shaft loads increase further.

The torque loads produced by such fuel systems create torsional vibration in the fuel injection drive system. This torsional vibration causes the meshed teeth of the timing gears to bounce or clash back and forth against each other through the backlash therebetween. This bouncing and clashing produces an objectional noise known as gear rattle. Not only does such torsional vibration cause impacts in the fuel system drive gears, but these impacts further excite the entire engine structure to vibrate, thus producing high levels of exterior noise. These gear impacts can cause excessive gear wear and failures, as well as substantially increased overall engine noise levels.

There is therefore a need in the prior art for a device that will substantially lessen the torsional vibration produced by the fuel injection drive system and thereby lower engine noise levels and vibration. The present invention is directed toward meeting these needs.

SUMMARY OF THE INVENTION

The present invention relates to a fuel system vibration damper. A damper is affixed to the fuel system drive gear in order to counteract torsional vibration produced in the fuel system drive gear by the fuel system, such as a final injection system or a fuel pump. The damper additionally dampens the response of the entire fuel system drivetrain, thereby reducing engine noise due to gear rattle.

In one form of the invention an engine is disclosed, comprising a crankshaft having a nonzero rotational energy when said engine is operating; a fuel system drive gear; a drive mechanism coupled to the crankshaft and to the fuel system drive gear for transmitting at least a portion of the rotational energy to the fuel system drive gear; and a fuel system coupled to the fuel system drive gear; and a damper coupled to the fuel system drive gear and operable to dampen torsional excitation produced by the fuel system.

In another form of the invention, an engine fuel system is disclosed, comprising a fuel injection system; a fuel system drive gear coupled to the fuel injection system and operable to transmit energy to the fuel injection system; and a damper coupled to the fuel system drive gear and operable to dampen torsional excitation of the fuel system drive gear by the fuel injection system.

In another form of the invention, an engine fuel system is disclosed, comprising a fuel pump; a fuel system drive gear coupled to the fuel pump and operable to transmit energy to the fuel pump; and a damper coupled to the fuel system drive gear and operable to dampen torsional excitation of the fuel system drive gear by the fuel pump.

DESCRIPTION OF THE PREFERRED EMBODIMENT

Figure 1:
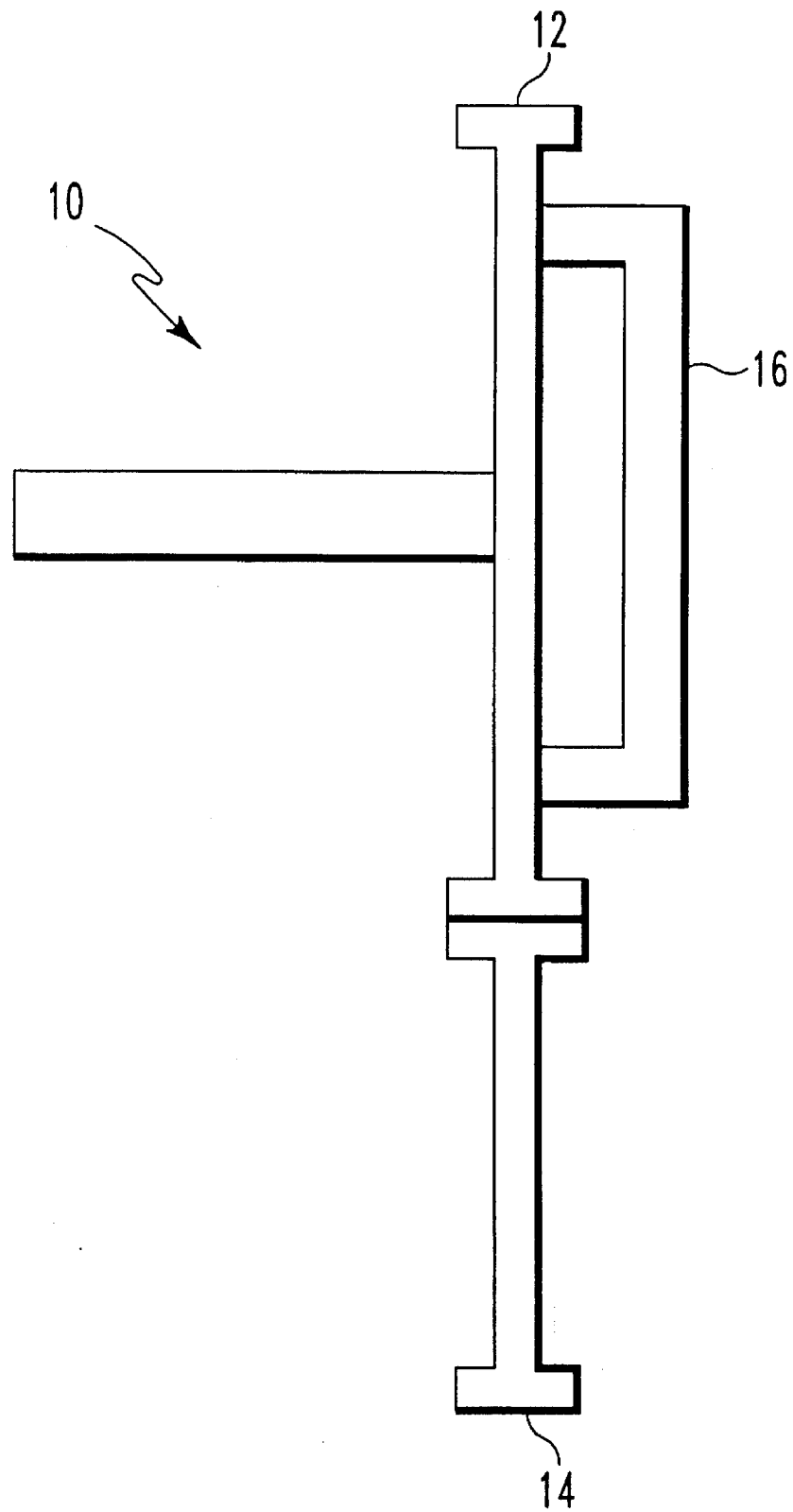
FIG. 1 is a schematic cross-sectional view of a fuel injection drive system with a damper of the present invention.

For the purposes of promoting an understanding of the principles of the invention, reference will now be made to the embodiment illustrated in the drawings and specific language will lye used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

There are several different types of fuel injection systems. For example, there are unit injector fuel systems and pump-line-nozzle systems. Regardless of the type of fuel injection system used, the fuel injection system develops an injection pressure which forces fuel through the injector nozzle in the case of a unit injector or delivers fuel to the line-nozzle in the case of a pump-line-nozzle fuel system. In the process of developing such high injection pressures, alternating torques are produced in the fuel injection drive gears. These alternating torques have very high peak amplitudes which are much higher than the mean torque of the system. These high-peak alternating torques will cause the fuel injection system and attached elements (for example fuel injection system drive gears) to speed up and slow down. This torsional excitation is also transmitted to any system attached to the fuel injection drive gears. As a result of this torsional excitation, the system attached to the fuel injection system drive gear has a vibration response which can be very large. This large vibration response can cause part failures and also is a source of increased engine noise.

Referring to FIG. 1, a fuel system drive gear and attached system is schematically illustrated in cross-section. The fuel injection system 10 includes a drive gear 12 which is driven by an intermeshed gear train 14. During operation of the fuel injection system 10, torsional excitation is produced from the process of developing large injection pressures and is applied to the fuel system drive gear 12. The fuel system drive gear may be, for example, a cam shaft gear for unit injectors or a fuel pump gear for pump-line-nozzle systems. The gear train 14 is typically a system of one or more gears which transmit the rotational velocity of the engine crank shaft to the fuel system drive gear 12. The gear train 12, 14 which couples the engine crank shaft and fuel system 10 inherently exhibits backlash in the meshed teeth of the various gears due to the need for some tolerance in the meshing arrangement. The torsional excitation produced by the fuel system 10 causes the fuel system drive gears to rotate in forward and reverse directions, which can cause the gears 12, 14 to work through their backlashes. When these gears go through backlashes, very high impact forces are generated between the intermeshed teeth, which can cause high engine noise levels and gear failures due to premature wear. Furthermore, these torsional vibrations are transmitted through the gear train 14 and excite other system resonances in the engine and drivetrain. The result is increased vibration of the entire engine and drivetrain.

The present invention is directed toward reducing such torsional vibration and gear backlash impact forces by the addition of a damper 16 to the fuel system drive gear 12. The use of the word "damper" herein is intended to encompass any device which converts vibrational energy into heat, thereby dissipating any mechanical motion caused by the vibrational energy. Adding a vibration damper 16 to the fuel system drive gear 12 reduces the effects of torsional vibration in two different ways. First, the input displacements transmitted from the fuel system 10 drive shaft to the fuel system drive gear 12 are reduced by the added inertia and damping provided by the damper 16. The increased rotational inertia provided by the damper 16 tends to prevent the drive system gears from going through backlashes. In addition, the complete system attached to the fuel system drive gear 12 (the gear train 14, for example) is now a more highly damped system and therefore exhibits less response to the impact excitation from the gears going through backlashes. Therefore, the addition of the damper 16 to the fuel system drive gear 12 reduces both the torsional vibration input to the system, as well as the resonant impact response of the system. It is this double effect of the damping device 16 which makes the present invention particularly useful in reducing engine noise and gear wear. It will be appreciated by those skilled in the art that the vibration damper 16 added to the fuel injection system can comprise any device which is capable of producing torsional damping. For example, a viscous damper or a tuned rubber damper could be used. Furthermore, the damper 16 may be attached to the fuel system drive gear 12 by any convenient means, the only requirement being that the connection allows the damping effects of the damper 16 to be transmitted to the fuel system drive gear 12.

Figure 3:
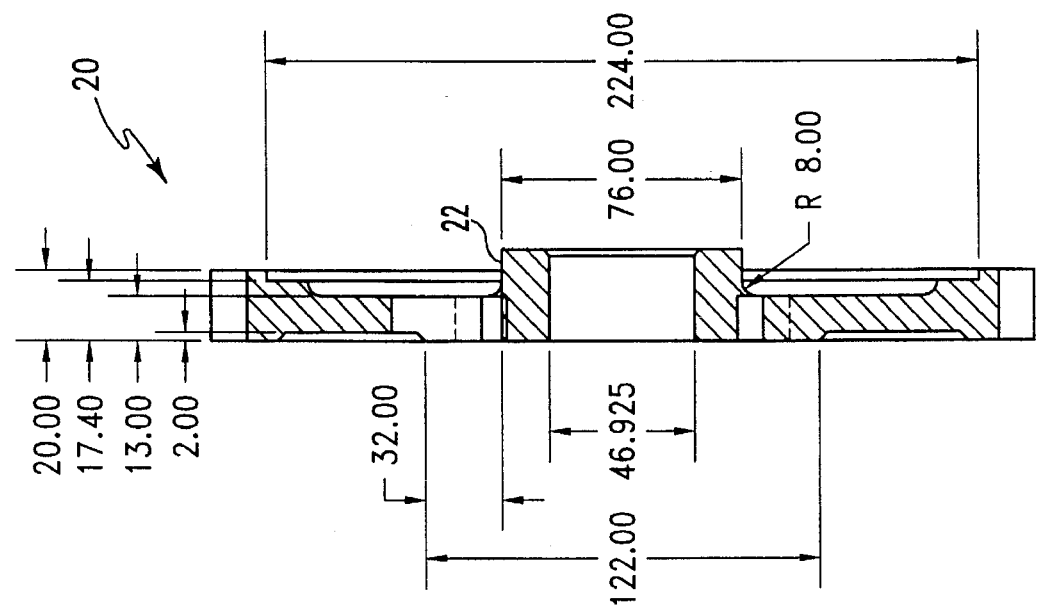
FIG. 3 is a cross-sectional view of the fuel injection drive gear of FIG. 2.
Figure 2:
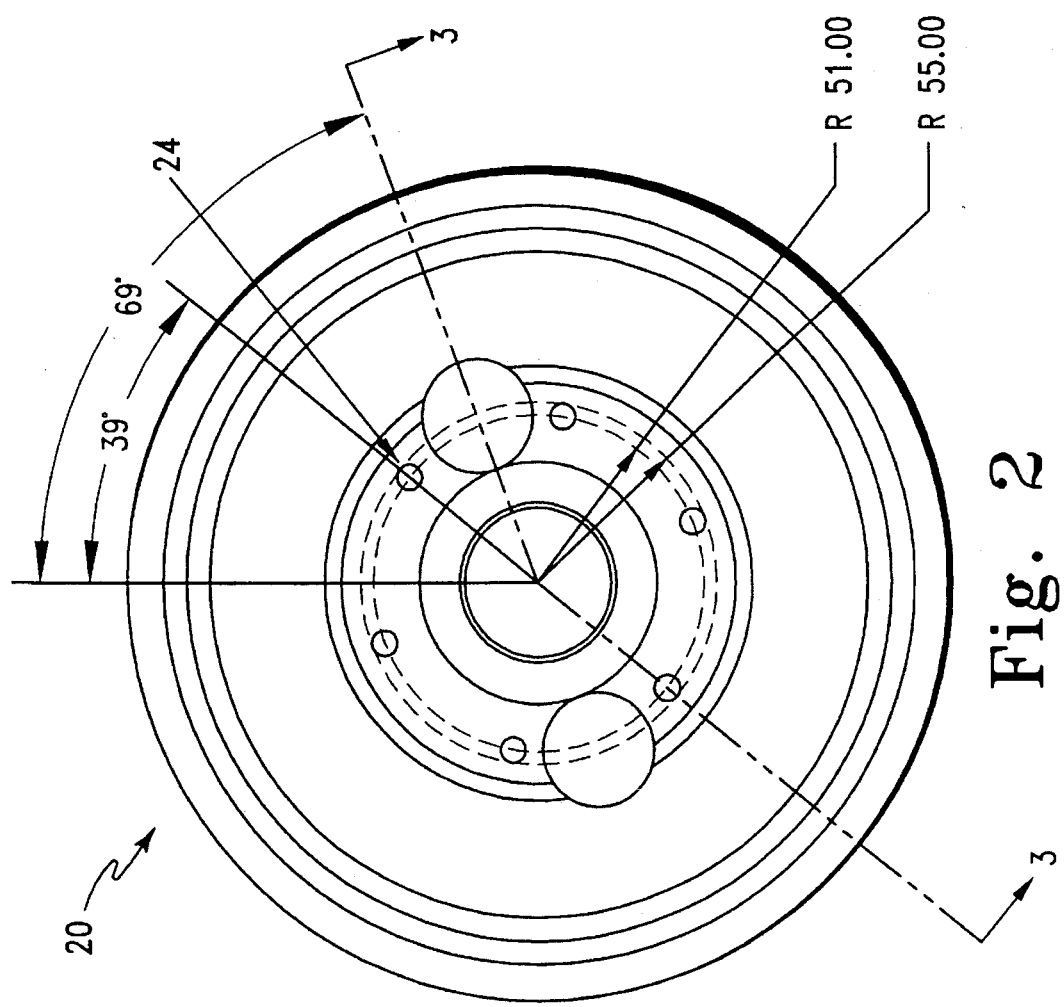
FIG. 2 is a plan view of a fuel injection drive gear of the present invention.
Figure 4:
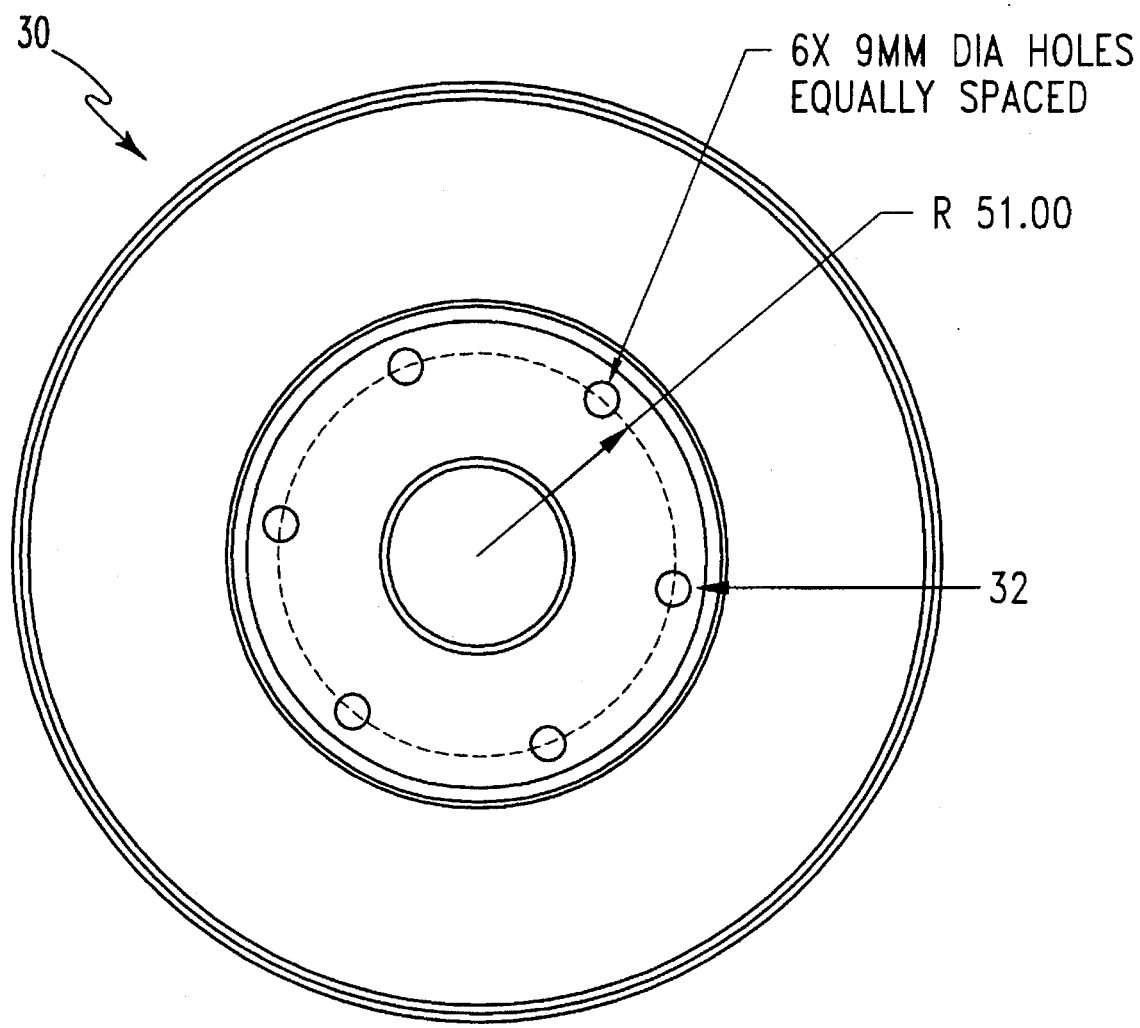
FIG. 4 is a plan view of a first embodiment damper of the present invention.

Referring now to FIG. 2, there is shown a plan view of a first embodiment cam shaft gear 20 which is designed to accept a viscous damper mounted thereon. The cam gear 20 is shown in cross-section in FIG. 3. The cam gear 20 has a hub 22 of increased thickness which allows a mounting surface for a vibration damper. The housing of such a vibration damper is illustrated in FIG. 4 and indicated generally at 30.

Figure 5:
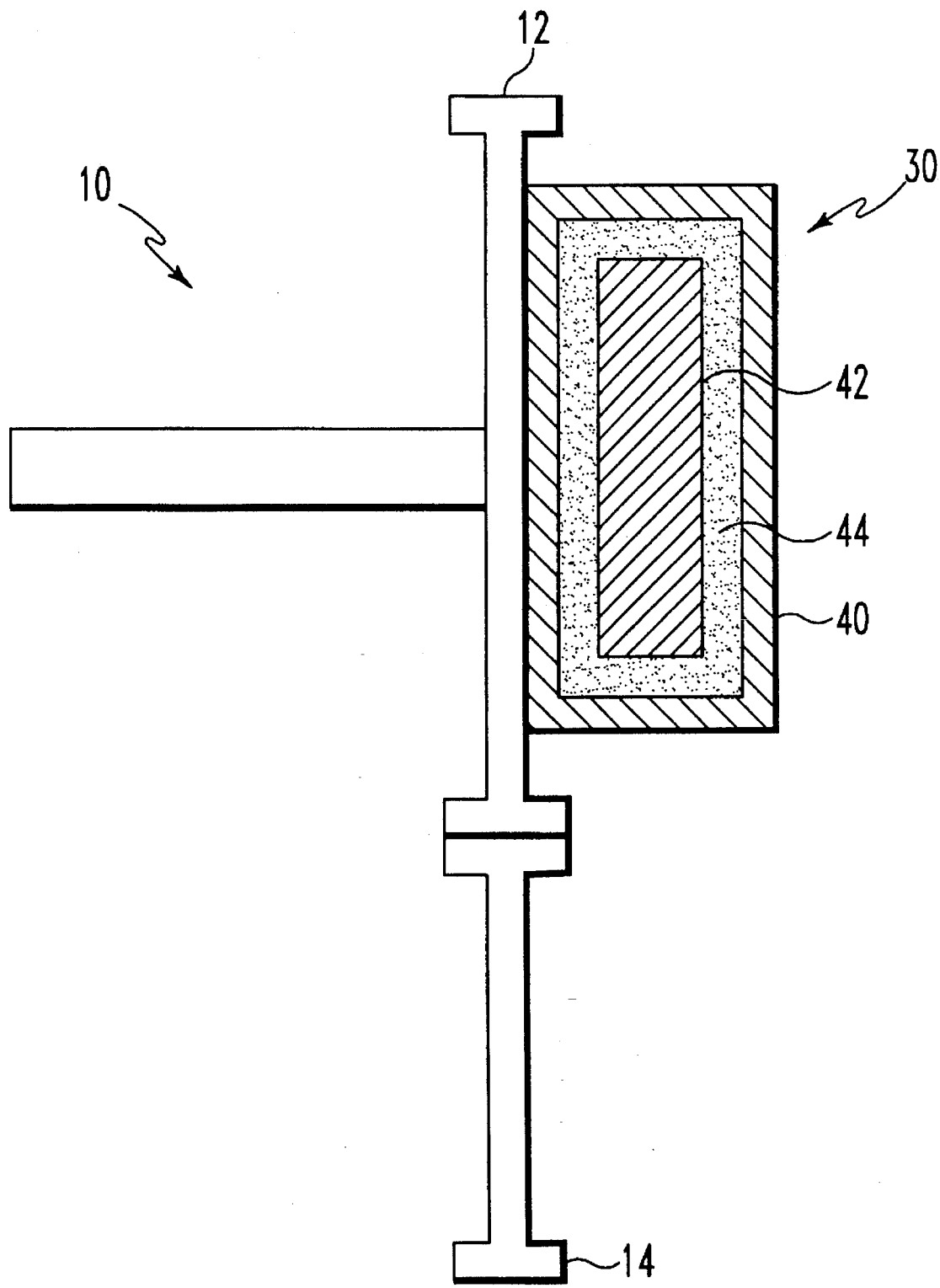
FIG. 5 is a schematic cross-sectional view of a fuel injection drive system with a viscous damper of the present invention.

Referring now to FIG. 5, the viscous torsional vibration damper 30 is shown in schematic cross-section. The torsional viscous damper 30 is composed of three basic elements. They are the outside housing 40, the free mass element 42, and the viscous fluid 44. The outside housing is attached to the fuel system drive gear 12 and is rotated thereby. The viscous fluid 44 is filled in between the outside housing 40 and the free mass element 42. When the fuel system drive gear 12 experiences torsional vibrations (i.e. when it speeds up and slows down), the attached housing element 40 also experiences torsional vibrations. The torsional vibrations of the housing 40 cause the free mass element 42 to experience torsional vibration transmitted through the viscous fluid 44. Due to the low shear strength of the viscous fluid 44 and the relatively large inertia of the free mass 42, the torsional vibration of the housing 40 is not completely transferred to the free mass 42. Thus, there is relative motion between the free mass 42 and the housing 40. The relative torsional motion of the free mass 42 and the housing 40 shears the viscous fluid 44, which produces damping of the attached system. In other words, the torsional vibration of the fuel system drive gear 12 is converted into heat in the viscous fluid 44.

Figure 6:
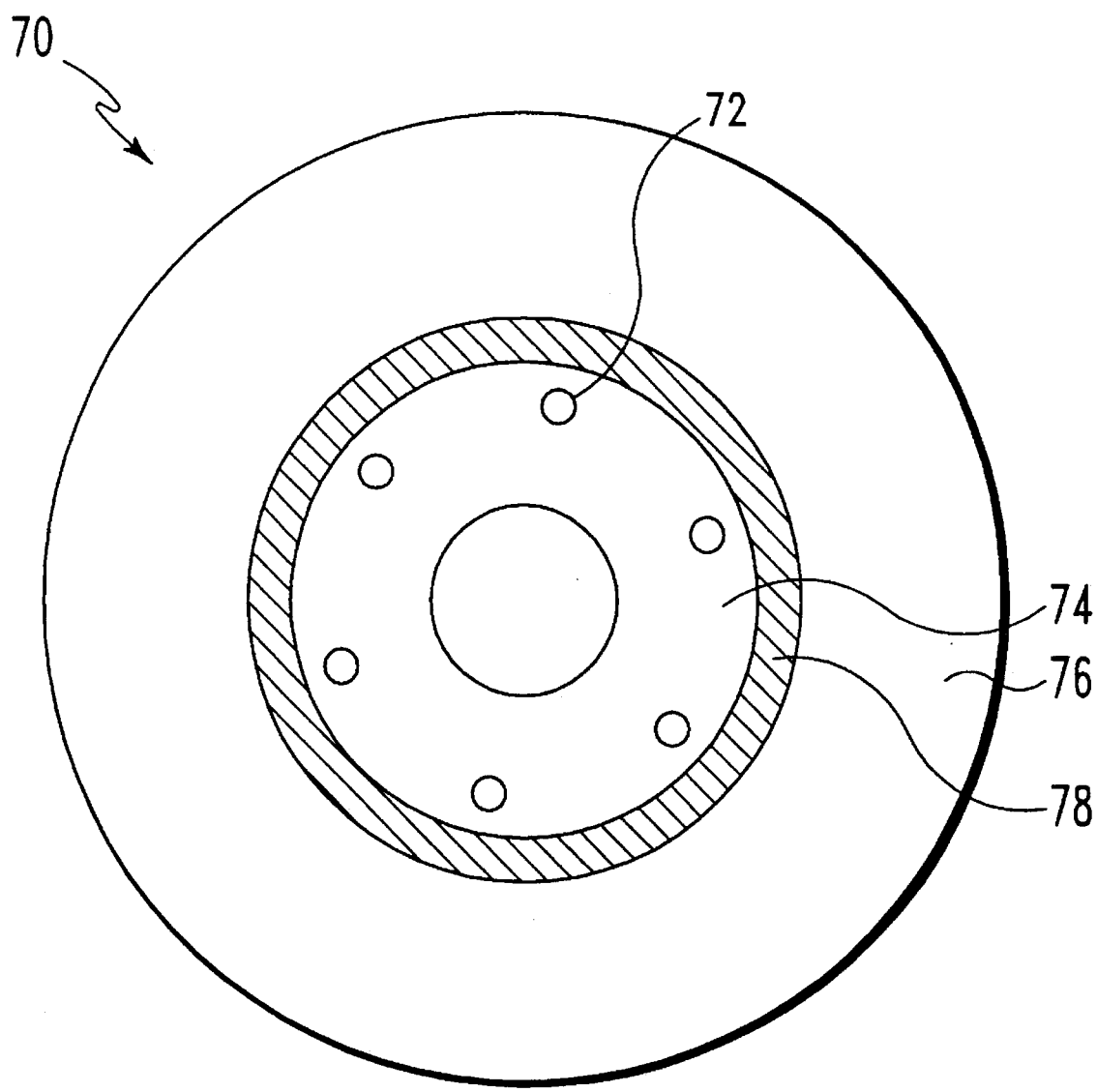
FIG. 6 is a schematic plan view of a second embodiment damper of the present invention.

Referring now to FIG. 6, a tuned rubber damper is schematically illustrated and indicated generally at 70. The tuned rubber damper 70 may be mounted to the hub 22 of the cam gear 20 of FIG. 2 by means of bolts extending through mounting holes 72. The damper 70 comprises an inner mounting section 74 and a circumferential mass 76 formed of, for example, steel. The mass 76 is joined to the inner section 74 by an elastic section 78, which is preferably made from rubber. The elastic section 78 has a spring constant that is tuned to have a resonant frequency equal to the vibrational frequency to be damped. When torsional vibration energy is applied to the inner section 74 through the cam gear 20, the resonance of the elastic section 78 produces an out-of-phase vibration in the mass 76. The vibration of the mass 76 therefore cancels the input torsional vibration, dissipating the energy as heat in the elastic section 78.

Figure 7:
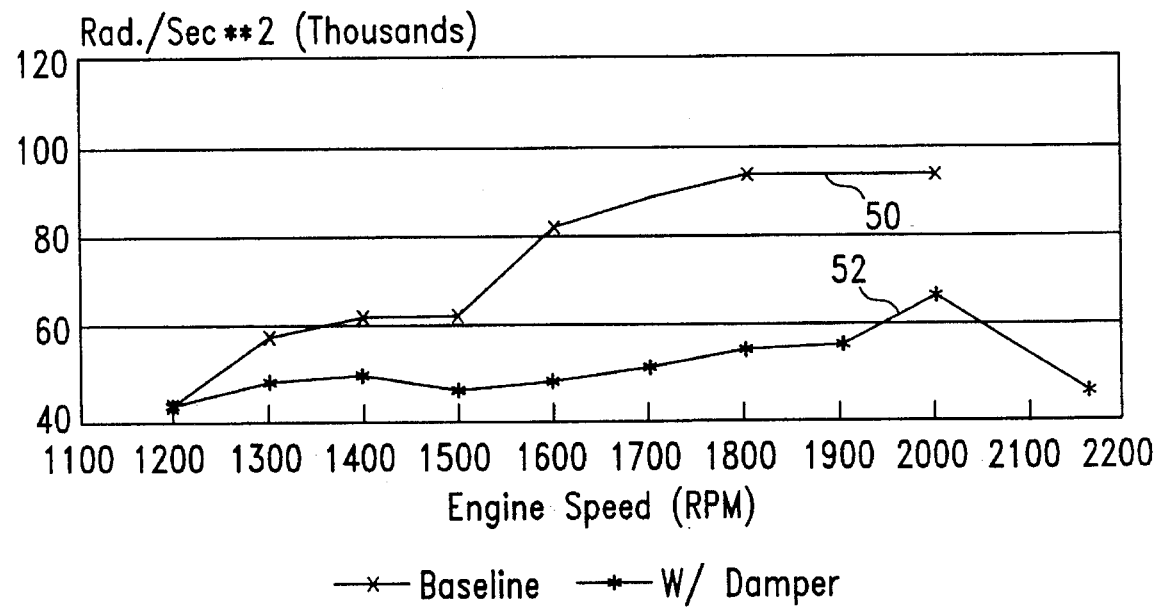
FIG. 7 is a graph of cam gear torsional acceleration as a function of engine speed, both with and without the damper of the present invention.
Figure 8:
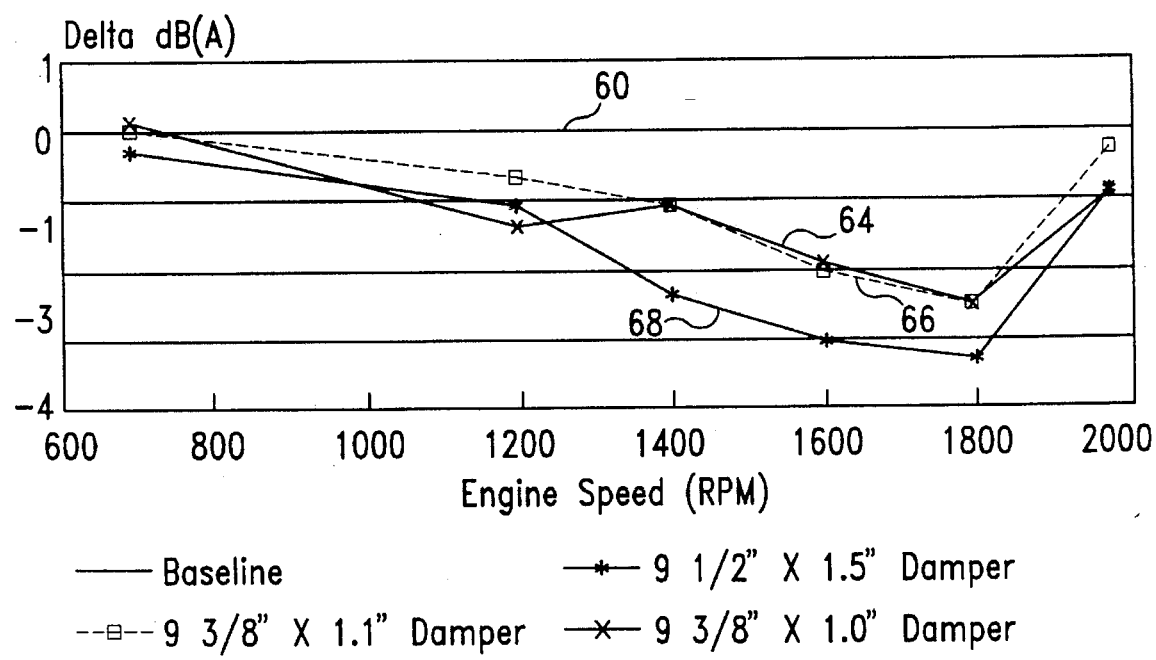
FIG. 8 is a graph of engine noise level with various fuel injection drive system damping arrangements.

Referring now to FIG. 7, the torsional acceleration of the cam gear 12 is plotted as a function of engine speed. The line 50 represents base line cam gear torsional acceleration data taken on a diesel engine. The damped response 52 was produced from measurements on the same engine with a 9⅜"×1" viscous cam damper mounted to the cam gear. It is readily apparent that the torsional acceleration of the cam gear is significantly reduced by the application of the damper. Reduction of the cam gear torsional acceleration is directly related to a reduction in gear impact due to the gears going through backlashes. FIG. 8 shows the noise levels of the same engine measured from one meter in front of the engine at various engine speeds. All dampers used to create the data of FIG. 8 are viscous dampers. The line 60 at zero dB(A) represents the base line engine noise level. The line 64 represents the engine noise level when a 9⅜"×1" viscous damper is attached to the cam gear, while the line 66 represents the engine noise level using a 9⅜"×1.1" viscous damper. The differences in the line 64 and 66 illustrate the importance of tuning the damper to the particular system being damped. Small changes in the damper design can have significant effects on the engine noise levels. Finally, line 68 represents the engine output noise when a 9½"×1.5" viscous damper is attached to the cam gear. It will be appreciated by those skilled in the art that the selection of the proper damping device for use with the fuel injection system can produce a significant reduction in engine output noise. In the example of FIG. 8, the 9½"×1.5" damper produced nearly a 3.5 dB(A) improvement in engine noise at 1800 rpm.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An engine, comprising:

a crankshaft having a nonzero rotational energy when said engine is operating;

a fuel system drive gear;

a drive mechanism coupled to the crankshaft and to the fuel system drive gear for transmitting at least a portion of the rotational energy to the fuel system drive gear;

a fuel system coupled to the fuel system drive gear; and a damper coupled to the fuel system drive gear and operable to dampen torsional excitation produced by the fuel system during a fuel injection event.

2. The engine of claim 1, wherein the damper is a viscous damper.

3. The engine of claim 2, wherein the viscous damper comprises:

a housing;

a free mass element contained within the housing; and a quantity of viscous fluid contained within the housing and surrounding the free mass element.

4. The engine of claim 1, wherein the fuel system is a fuel injection system.

5. The engine of claim 1, wherein the drive mechanism is a gear train.

6. The engine of claim 1, wherein the engine is a diesel engine.

7. The engine of claim 1, wherein the damper is a tuned elastic damper.

8. The engine of claim 7, wherein the tuned elastic damper comprises:

a mounting section;

an elastic section coupled to the mounting section; and a mass coupled to the elastic section.

9. The engine of claim 8, wherein the elastic section is comprised of rubber.

10. An engine fuel system, comprising:

a fuel injection system;

a fuel system drive gear coupled to the fuel injection system and operable to transmit energy to the fuel injection system; and a damper coupled to the fuel system drive gear and operable to dampen torsional excitation of the fuel system drive gear by the fuel injection system during a fuel injection event.

11. The engine fuel system of claim 10, wherein the damper is a viscous damper.

12. The engine fuel system of claim 11, wherein the viscous damper comprises:

a housing;

a free mass element contained within the housing; and a quantity of viscous fluid contained within the housing and surrounding the free mass element.

13. The engine fuel system of claim 10, wherein the fuel injection system supplies fuel to a diesel engine.

14. The engine of claim 10, wherein the damper is a tuned elastic damper.

15. The engine of claim 14, wherein the tuned elastic damper comprises:

a mounting section;

an elastic section coupled to the mounting section; and a mass coupled to the elastic section.

16. The engine of claim 15, wherein the elastic section is comprised of rubber.

17. An engine fuel system, comprising:

a fuel pump;

a fuel system drive gear coupled to the fuel pump and operable to transmit energy to the fuel pump; and a damper coupled to the fuel system drive gear and operable to dampen torsional excitation of the fuel system drive gear by the fuel pump during a fuel injection event.

18. The engine fuel system of claim 17, wherein the damper is a viscous damper.

19. The engine fuel system of claim 18, wherein the viscous damper comprises:

a housing;

a free mass element contained within the housing; and a quantity of viscous fluid contained within the housing and surrounding the free mass element.

20. The engine fuel system of claim 17, wherein the fuel pump supplies fuel to a diesel engine.

21. The engine of claim 17, wherein the damper is a tuned elastic damper.

22. The engine of claim 21, wherein the tuned elastic damper comprises:

a mounting section;

an elastic section coupled to the mounting section; and a mass coupled to the elastic section.

23. The engine of claim 22, wherein the elastic section is comprised of rubber.

* * * * *

UNITED STATES PATENT AND TRADEMARK OFFICE
CERTIFICATE OF CORRECTION

PATENT NO. : 5,558,066
DATED : September 24, 1996
INVENTOR(S) : Alan H. Zhao

It is certified that error appears in the above-identified patent and that said Letters Patent is hereby corrected as shown below:

In column 1, line 64, please change "final" to --fuel--.

In column 2, line 53, please change "lye" to --be--.

Signed and Sealed this

Twenty-fifth Day of March, 1997

Attest:

BRUCE LEHMAN

*Attesting Officer*   *Commissioner of Patents and Trademarks*